Sept. 11, 1956  P. ORR  2,762,233
TRANSMISSION LUBRICATION
Filed Oct. 16, 1951  2 Sheets-Sheet 1

Inventor:
Palmer Orr
By: Keith J. Blews
Atty.

Sept. 11, 1956 P. ORR 2,762,233
TRANSMISSION LUBRICATION
Filed Oct. 16, 1951 2 Sheets-Sheet 2
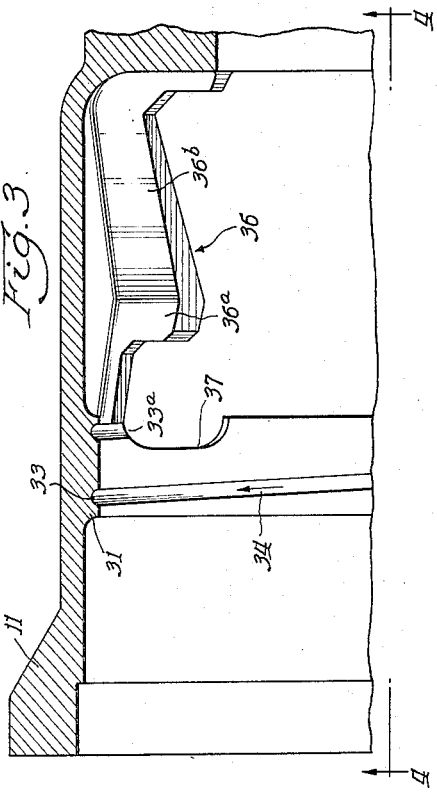
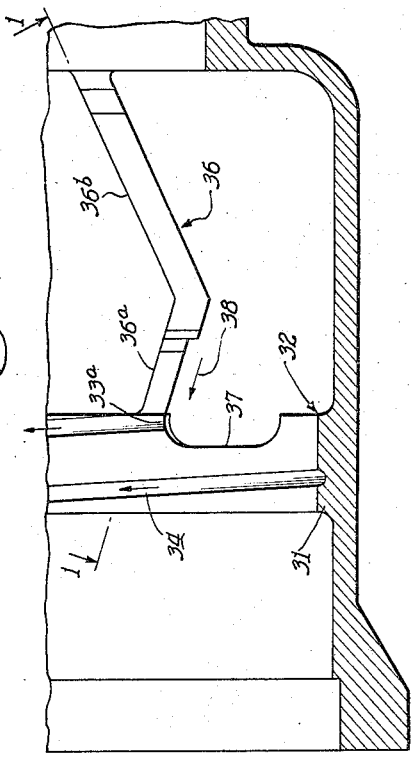
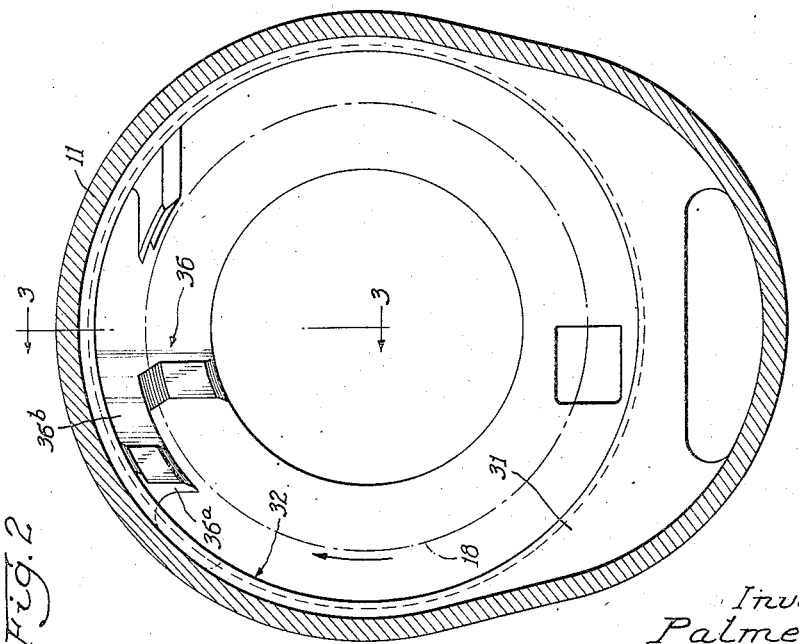
Inventor:
Palmer Orr
By: Keith J. Blever Atty.

2,762,233

TRANSMISSION LUBRICATION

Palmer Orr, Muncie, Ind., assignor to Borg-Warner Corporation, Chicago, Ill., a corporation of Illinois Application October 16, 1951, Serial No. 251,532

1 Claim. (Cl. 74—467)

My invention relates to transmissions for automotive vehicles and more particularly to auxiliary transmissions of the planetary type commonly known as overdrives adapted to be connected behind and in tandem with ordinary manually controlled countershaft-type transmissions.

An overdrive transmission commonly includes, as a part of its planetary gear set, a driven ring gear connected with the output or driven shaft of the transmission, and it has been the experience with such transmissions that excessive noise has resulted from vibration of the ring gear due to minor unbalances of the gear, particularly in view of the relatively large diameter of the gear and its high peripheral speeds at high vehicle speeds.

It is an object of the present invention to provide an improved overdrive transmission so constructed as to minimize the noisy operation due to this cause, particularly by providing a pilot bearing formed in the casing of the transmission for the ring gear. More particularly, it is an object to provide an improved lubrication system for this pilot bearing, specifically by providing an oil groove formed in the overdrive casing so arranged that oil carried by the ring gear will cause a flow of oil through the groove.

It is also an object of the invention to provide a scraper rib within the overdrive casing which will scrape off oil carried by the ring gear and direct it into the oil groove, so that the groove will have a constant supply of oil.

The invention consists of the novel constructions, arrangements and devices to be hereinafter described and claimed for carrying out the above stated objects and such other objects as will appear from the following description of a preferred embodiment of the invention, illustrated with reference to the accompanying drawings, wherein:

Fig. 2 is a sectional view of the casing for the transmission taken on line 2—2 of Fig. 1;

Fig. 3 is a fragmentary sectional view of the transmission casing taken on line 3—3 of Fig. 2; and Fig. 4 is a fragmentary sectional view taken on line 4—4 of Fig. 3.

Like characters of reference designate like parts in the several views.

Figure 1:
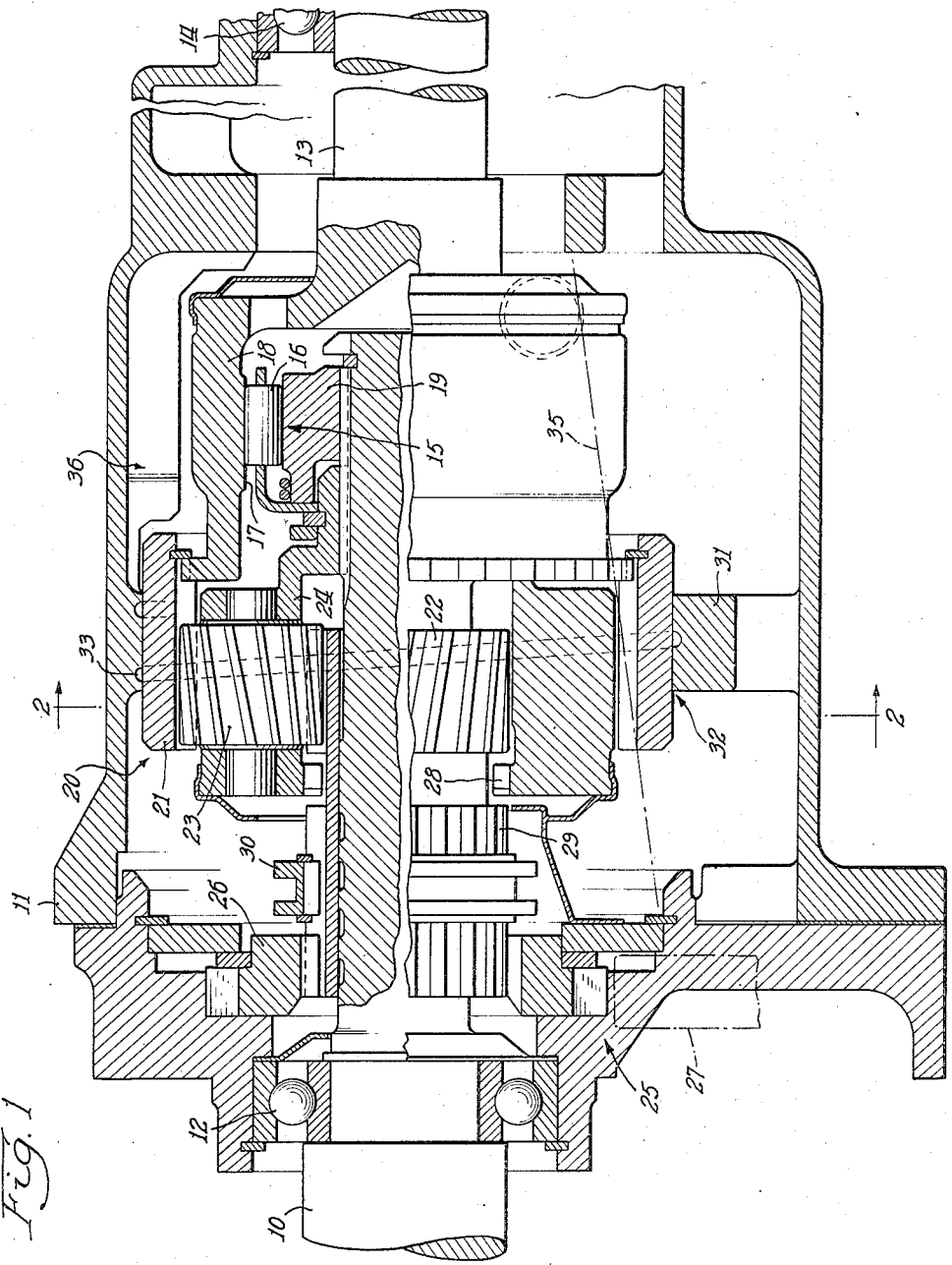
Fig. 1 is a view of a transmission embodying the principles of the invention which is longitudinally sectional except for a scraper rib 36 which is shown taken from the irregular line 1—1 in Fig. 4.

Referring now to the drawings, the illustrated transmission comprises a drive shaft 10 rotatably disposed within a transmission casing 11 by means of a bearing 12 and a driven shaft 13 coaxial with the shaft 10 and rotatably disposed within the casing 11 by means of a bearing 14.

A one-way clutch 15 is effectively disposed between the shafts 10 and 13. The one-way clutch comprises a plurality of rollers 16 disposed between an inwardly facing cylindrical surface 17 formed in a hollow extension 18 of the driven shaft 13 and a hub 19 fixed to the shaft 10. The hub 19 is provided with an inclined ramp (not shown) for each of the rollers 16 in accordance with a well-known arrangement of one-way engaging device, so that the rollers 16 wedge between the hub 19 and the surface 17 to transmit a drive from the shaft 10 to the shaft 13 in the forward direction, that is, in the same direction the shaft 10 is driven by the vehicle engine.

A planetary gear set 20 is provided for driving the driven shaft 13 at an overspeed with respect to the shaft 10. The planetary gear set comprises a ring gear 21 fixed to the hollow portion 18 of the shaft 13, a sun gear 22 rotatably disposed on the shaft 10, a plurality of planet pinions 23 (one only being illustrated) in mesh with both the ring gear 21 and the sun gear 22 and a planet pinion carrier 24 splined on the shaft 10 and rotatably carrying the pinions 23.

A brake 25 is provided for braking the sun gear 22 against rotation so as to complete an overspeed drive through the transmission. The brake 25 comprises a slotted element 26 splined to the sun gear 22, and a pawl 27 fixed with respect to the case 11 against any movement about the shafts 10 and 13 and movable radially with respect to the slotted element 26 into engagement with the latter element. The planet gear carrier 24 is provided with a plurality of internal teeth 28, and the sun gear 22 is provided with a similar number of external teeth 29. The sun gear 22 is movable longitudinally on the shaft 10 and within the slotted element 26 so that the teeth may interengage with the teeth 28. A grooved collar 30 is fixed on the sun gear 22 and may be utilized for shifting the sun gear 22 to bring its teeth 29 into or out of engagement with the teeth 28.

The casing 11 is provided with an internal transverse apertured wall 31 which extends around and is in contact with the external periphery of the ring gear 21 for forming a pilot bearing 32 for the ring gear. In order to provide lubrication for the bearing 32, I have provided a left-hand groove or channel 33 in the internal surface of the wall 31. The rotation of the ring gear 21 is in the clockwise direction as seen in Fig. 2 and is such as to tend to move oil through the groove 33 in the direction indicated by the arrow 34.

The casing 11 forms a sump for a body of oil which may have its surface at 35, and the ring gear on rotation carries the oil upwardly. A scraper rib 36 is provided within the casing 11 for catching the oil that is moved upwardly by the ring gear 21. The scraper rib 36 comprises two portions 36a and 36b extending at obtuse angles with respect to each other, and the portion 36a terminates in an oil pocket 37 formed in the wall 31 with which pocket the entrance end 33a of the groove 33 is in communication. As shown, the rib portion 36a in general lies adjacent the outer surface of the ring gear 21 and extends at an acute angle with respect to the oil groove 33 at its entrance end 33a.

In operation, the drive shaft 10 functions to drive the driven shaft 13 in a one to one single direction drive, assuming that the pawl 27 is disengaged with respect to the slotted element 26, through the one-way clutch 15. The rollers 16 wedge between the hub 19 and the internal cylindrical surface 17 of the hollow shaft portion 18, and the clutch 15 is engaged and carries the drive.

A two-way one to one drive may be obtained by moving the sun gear 22 to engage the teeth 29 with the teeth 28. The teeth 29 and 28 lock the sun gear 22 and planet gear carrier 24 together, so that the ring gear 21 is in effect locked with respect to these two elements and with respect to the drive shaft 10.

The shaft 13 is driven at an overspeed with respect to the shaft 10 and in the same direction by braking the slotted element 26 and sun gear 22 by engaging the pawl 27 with the slotted element 26 with the sun gear 22 being in its illustrated position with the teeth 29 and 28 out of engagement. In this case, the planet gear carrier 24 constitutes the driving element of the gear set 20, and the ring gear 21 and thereby the shaft 13 are driven at an overdrive. The sun gear 22 functions as the reaction element of the gear set, and the reaction from the sun gear 22 is transmitted through the brake 25 to the casing 11 with respect to which the pawl 27 is fixed against rotation.

The pilot bearing 32 for the ring gear 21 of the gearing 20 functions to reduce vibration of the ring gear 21 and other parts of the gear set and reduce noise in the overdrive unit. The ring gear 21 in its rotation carries oil from the body of oil in the bottom of the transmission casing 11 to the top of the transmission casing, and the rib portion 36a scrapes the oil from the ring gear, and the oil runs along the rib 36a in the direction indicated by the arrow 38 into the pocket 37. The oil flows from the pocket 37 into the entrance 33a of the groove 33 and flows through the groove, due to the rotation of the ring gear 21 in the direction of oil flow through the groove. The contacting surfaces of the ring gear 21 and the transverse rib 31 are thus effectively lubricated.

I wish it to be understood that my invention is not to be limited to the specific constructions and arrangements shown and described except only insofar as the claim may be so limited, as it will be understood to those skilled in the art that changes may be made without departing from the principles of the invention.

I claim:

In transmission mechanism, the combination of a drive shaft, a driven shaft, a planetary gear set for providing a change speed drive between said shafts and having a rotatable ring gear connected to one of said shafts, transmission casing for said gear set adapted to contain oil, means on said ring gear defining an elongated outer cylindrical bearing surface, means on said casing defining an elongated inner cylindrical bearing surface in bearing contact with said outer cylindrical surface of said ring gear to form a pilot bearing for said ring gear, means on said inner surface of said casing defining a ring-like oil channel therein extending around said ring gear, said channel defining means including means defining a channel entrance adjacent the top of said casing, means on an inner surface of said casing defining a pocket in communication with said channel entrance, and means integral with an inner surface of said casing defining a scraper rib comprising a first portion adjacent said outer ring gear surface and having an end disposed within said pocket and a second portion extending at an obtuse angle with respect to said first portion, said scraper rib being constructed and arranged to collect oil upon rotation of said ring gear and to direct oil flow into said pocket and entrance whereby rotation of said ring gear effects passage of oil through said oil channel and consequent lubrication of the pilot bearing.

References Cited in the file of this patent
UNITED STATES PATENTS

| Number | Name | Date |
|---|---|---|
| 167,006 | Ford | June 19, 1928 |
| 1,752,980 | Ford | Apr. 1, 1930 |
| 1,971,781 | Henderson | Aug. 28, 1934 |
| 2,015,108 | Harper | Sept. 24, 1935 |
| 2,067,079 | Fitzsimmons | Jan. 5, 1937 |
| 2,127,353 | Fishburn | Aug. 16, 1938 |
| 2,144,789 | Barnes | Jan. 24, 1939 |
| 2,162,251 | Emrick | June 13, 1939 |
| 2,200,890 | Murray | May 14, 1940 |
| 2,205,235 | Arnold | June 18, 1940 |
| 2,384,448 | Banker | Sept. 11, 1945 |
| 2,399,657 | Banker | May 7, 1946 |
| 2,593,629 | Swift | Apr. 22, 1952 |